United States Patent Office 3,041,174
Patented June 26, 1962

3,041,174
PROCESS FOR TREATING OIL-CONTAINING ANIMAL MATERIAL, SUCH AS FISH AND FISH OFFAL
Heinrich Matzen Ehlert, Copenhagen, Denmark, assignor to Messrs. A/S Lumino Feed Company, Copenhagen, Denmark
No Drawing. Filed Jan. 27, 1959, Ser. No. 789,245
2 Claims. (Cl. 99—7)

The present invention relates to a process for treating oil-containing animal materials, such as fish and fish offal, by subjecting the raw material to a mechanical disintegration to form a pulp, then treating the pulp with enzymes and, if desired, centrifuging the oil from the pulp.

For the production of food stuffs it is known to utilize oil-containing animal materials, and it is also known to recover oil from such materials ordinarily by mechanically disintegrating the raw material and then recovering the oil by centrifuging. To obtain an effective separation it is commonly known to heat or boil the raw material before the centrifuging thereby obtaining a separation of the product into oil, an aqueous liquid, the so-called glue-water, and dry matter.

However, this process has various drawbacks. For instance some valuable by-products which may for instance be used for processing food stuff will either be destroyed or essentially reduced by the heating. Furthermore, the heating or boiling involves considerable costs.

Processes for treating oil-containing materials without heating are also known. Thus, it has been proposed to subject the said materials to an acidification, for instance in the pH range from 1 to 5. It has also been proposed to treat the materials with living cultures of bacteria or various enzymes that may be recovered from microorganisms. However, none of said processes have become of practical importance, because under the hitherto used conditions it has been impossible to obtain a satisfactory yield of the oil and to produce a food stuff of great nutritive value.

The present invention has for its object to treat oil-containing animal materials, such as fish or fish offal, for recovering a great yield of animal oil and for producing food stuff having a high nutritive value. According to the invention this is achieved by adding to the pulp formed by mechanically disintegrating the materials a substrate of fermented dead culture of lactic acid bacterial. Such a substrate contains proteolytic enzymes known per se which convert the animal material in such a manner that the oil can easily be separated out by centrifuging. Thereby a very great yield of the oil is obtained and by the centrifuging, a pulp is simultaneously obtained containing the original proteins in hydrolyzed state and of a very great nutritive value.

It has been found that this result is a consequence of the use of the special culture of bacteria, while a fresh culture containing living lactic acid bacteria cannot be used. This is probably due to the fact that the active enzymes effecting a quick hydrolysis of the proteins and facilitating the separation of the oil from the pulp are not formed or released until after the final fermentation of the culture of bacteria and the death of the cells. When a culture of bacteria after the final fermentation stands for a long time without being supplied with nutrient for the bacteria, the culture will die, but, of course, the bacteria may also be killed by the addition of any bactericidal means.

According to the invention it has been found preferable to carry out the treatment of the pulp with enzymes for a period of at least 3 hours at a temperature of 20° to 50° C. Under these conditions the proteolytic enzymes in the culture of bacteria will have maximum of effect. The minimum of time for the treatment will to some extent depend upon the temperature. Thus, the process may be carried out in 5 to 6 hours at a temperature of 30° to 40° C., but a longer time for the treatment will often be of advantage.

The mechanical disintegration may for instance be executed by means of a vacuum gear pump or other appropriate disintegrating devices, for instance choppers, impact mills, centrifugal mills and rolling mills.

In an embodiment of the process according to the invention it has been found appropriate to mix the pulp with acid to obtain a pH of 3.6 to 4.2, the decomposition being thereby accelerated, and the final product will get an excellent storing resistance and maintain a high nutritive value, the presence of the fermented and dead culture of lactic acid bacteria having the effect that the pH value will remain practically constant.

The pulp has a very high nutritive value owing to a large content of free amino acids. The product is therefore very well adapted as food stuff either alone or mixed with other food stuff.

The produced food stuff may in many cases be used without separating out the oil, because the extra-ordinary durability and great nutritive value of the material still bring about considerable advantages. The produced pulp is well adapted for treatment by atomization drying, the powder formed thereby being easily soluble in water.

An appropriate embodiment of the process according to the invention is characterized in that in addition to the enzymes supplied with the fermented cultures of dead lactic acid bacteria further enzymes are added to the pulp, such as papain, katepsin, lipases or corresponding hydrolyzing enzymes. In this manner the decomposition of the proteins to free amino acids is accelerated.

The process according to the invention shall be further described by way of some examples of execution.

*Example 1*

By means of a meat chopper herrings are ground to a mass which is further pulverized by means of a flail impact mill. The pulverized mass is transferred to a container in which it is mixed with a fermented culture of dead lactic acid bacteria. The mixture is heated in the container at a temperature of 35° to 40° C. and is circulated by means of a vacuum gear pump being thereby further pulverized and homogenized.

This treatment is continued for 5 to 6 hours, and after this period the cells are so disintegrated that the oil may be separated out by centrifuging. Then the pulp is heated in a stirring device with a steam jacket at a temperature of 50° C. and passed over a vibratory screen to one or more sludge centrifuges where it is divided into three phases, viz. oil, an aqueous solution, and a sludge phase. The oil is finished in a manner known per se in a purificator, and the aqueous solution and the sludge phase are brought together in a container and mixed by means of a pump. This pulp the oil content of which is reduced to 0.3 to 0.5% is adjusted at a pH of 3.9 and is now durable for months.

By treating raw herring mass with 65.5% water, 14.0% oil, 15.5% proteins and 0% free amino acids and by use of the treatment with the culture of bacteria as stated a pulp is obtained containing 67% water, 13.8% oil and 15.0% proteins, 10% thereof being free amino acids. By centrifuging 13% oil are recovered, i.e. a yield of 94 to 95%.

*Example 2*

As mentioned in example 1 a pulp of whale meat is produced and treated with a corresponding fermented culture of lactic acid bacteria. Then papain is added and the mixture is adjusted at a pH of above 4.5 and heated at 35° to 40° C. After a period of 3 hours the pH value is reduced to 3.7 by adding acid, and the pulp is further treated for 3 hours under stirring. After removal of the oil by centrifuging the residue is dried by atomization. A dry powder having an excellent nutritive value is thereby obtained.

I claim:
1. A process for treating animal material, fish and fish offal, which comprises subjecting the raw material to a mechanical disintegration to form a pulp, adding to the pulp, without any substantial heating or dilution of the pulp, a substrate of fermented culture of lactic acid bacteria in which the bacteria are dead, and establishing and maintaining at a temperature of 20° C. to 50° C. for at least 3 hours a pH-value of 3.6 to 4.2 in the pulp.

2. A process for treating animal material, fish and fish offal, which comprises subjecting the raw material to a mechanical disintegration to form a pulp, adding to the pulp, without any substantial heating or dilution of the pulp, a substrate of fermented culture of lactic acid bacteria in which the bacteria are dead, and establishing and maintaining at a temperature of 20° C. to 50° C. for at least 3 hours a pH-value of 3.6 to 4.2 in the pulp, thereafter subjecting the pulp to a centrifuging process at a temperature within the aforementioned limits for separating the oil from the pulp.

References Cited in the file of this patent
UNITED STATES PATENTS

| | | |
|---|---|---|
| 2,525,294 | Gunther | Oct. 10, 1950 |
| 2,806,790 | Bedford | Sept. 17, 1957 |